United States Patent [19]
Riccitelli

[11] Patent Number: 5,678,433
[45] Date of Patent: Oct. 21, 1997

[54] ANTITHEFT DEVICE FOR LOCKING THE STEERING WHEEL OF ANY KIND OF VEHICLE

[76] Inventor: Guglielmo Riccitelli, No.3/a, Via Capo Passero—00122 Rome, Ostia, Italy

[21] Appl. No.: 525,027

[22] Filed: Sep. 8, 1995

[30] Foreign Application Priority Data

Sep. 19, 1994 [IT] Italy .................... RM94A0595

[51] Int. Cl.⁶ .................................................. B60R 25/02
[52] U.S. Cl. .................................................. 70/209; 70/226
[58] Field of Search ................... 70/209–211, 212, 70/225, 226–237, 238

[56] References Cited

U.S. PATENT DOCUMENTS

| | | |
|---|---|---|
| 3,828,593 | 8/1974 | Bolton. |
| 4,444,030 | 4/1984 | Dausch. |
| 4,829,797 | 5/1989 | Wu. |
| 4,882,920 | 11/1989 | Wu. |
| 5,024,069 | 6/1991 | Hull, Jr. et al.. |
| 5,052,201 | 10/1991 | Liou. |
| 5,092,146 | 3/1992 | Wang .............................. 70/226 |
| 5,129,245 | 7/1992 | Chang. |
| 5,168,732 | 12/1992 | Chen et al. ...................... 70/209 |
| 5,197,308 | 3/1993 | Pazik. |
| 5,212,973 | 5/1993 | van Staden et al. ............ 70/226 |
| 5,297,406 | 3/1994 | Lin ................................. 70/226 |
| 5,299,438 | 4/1994 | Chen. |
| 5,325,688 | 7/1994 | Jaw-Jia .......................... 70/209 |
| 5,375,441 | 12/1994 | Liou ............................... 70/209 |
| 5,435,158 | 7/1995 | Ta-Yung ......................... 70/209 |
| 5,454,240 | 10/1995 | Whitney ......................... 70/226 |
| 5,454,241 | 10/1995 | Elam ............................... 70/209 |
| 5,457,972 | 10/1995 | Lo ................................... 70/209 |
| 5,491,991 | 2/1996 | Guillory .......................... 70/238 |

FOREIGN PATENT DOCUMENTS

| | | | |
|---|---|---|---|
| 068335 | 1/1983 | European Pat. Off.. | |
| 620940 | 5/1927 | France. | |
| 2178620 | 11/1973 | France. | |
| 2639591 | 6/1990 | France ........................... | 70/226 |
| 9309555 | 8/1993 | Germany. | |
| 1127524 | 9/1968 | United Kingdom .......... | 70/226 |
| 2106058 | 4/1983 | United Kingdom .......... | 70/226 |
| 92004211 | 3/1992 | WIPO ............................ | 70/226 |

Primary Examiner—Darnell M. Boucher
Attorney, Agent, or Firm—Beveridge, Degrandi, Weilacher & Young, LLP

[57] ABSTRACT

The present invention relates to an antitheft device for locking the steering wheel of any kind of vehicle, comprising a first outer locking element (1; 21), provided with a mechanism (2; 23, 25) for the coupling with a section (3, 3'; 24) of the steering wheel. A second inner locking element (5; 22) is movable with respect to said first locking element (1; 21) and provided with at least a projecting tongue (6; 27) coupling with the steering wheel (3, 3'; 24) and interacting with the coupling mechanism (2; 23, 24). A section of the steering wheel is provided on said first element (1; 21) so as to lock the outer ring of the steering wheel and at least one spoke (4; 29) of the steering wheel. There is an opening and closure mechanism (7, 8, 9, 10, 11; 28) for the antitheft device. A first outer element (1; 21) is provided with a projection interfering with other parts of the vehicle so as to prevent the free rotation of the steering wheel when the antitheft device is on.

12 Claims, 7 Drawing Sheets

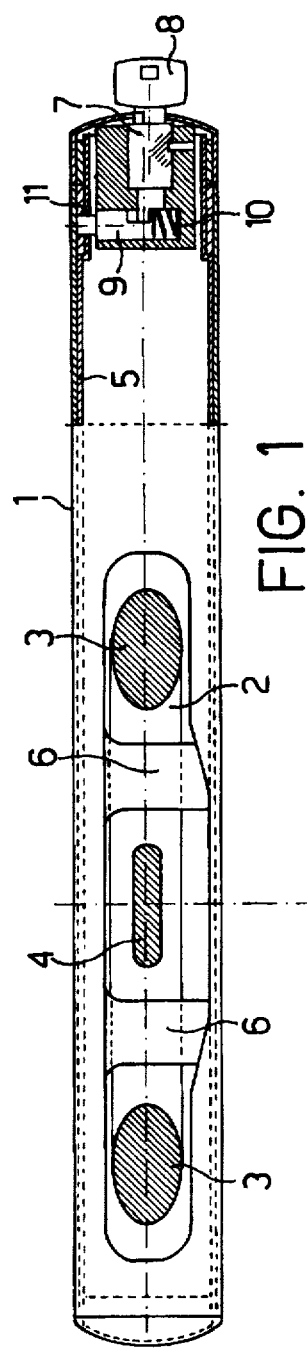
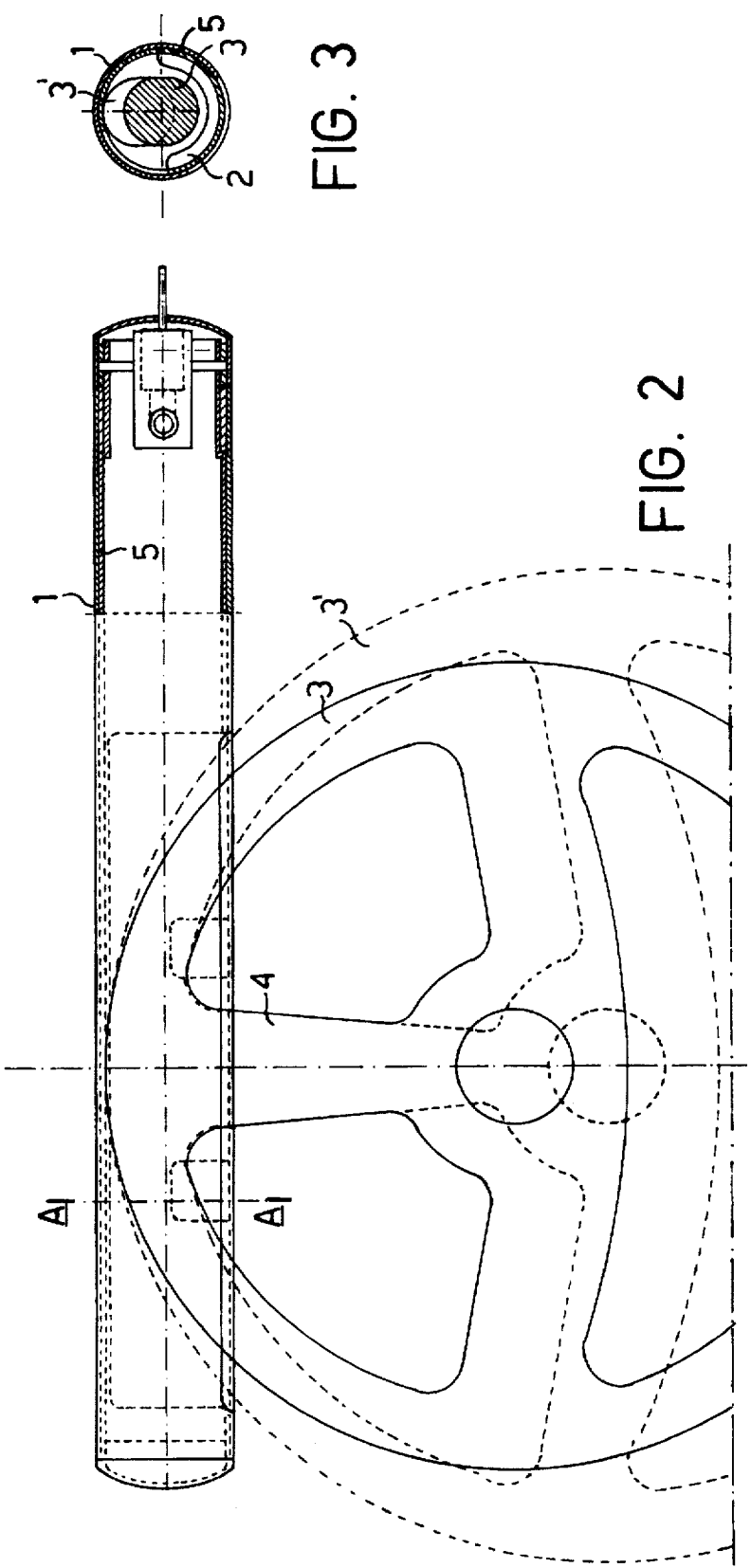
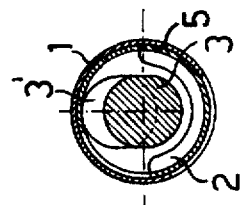

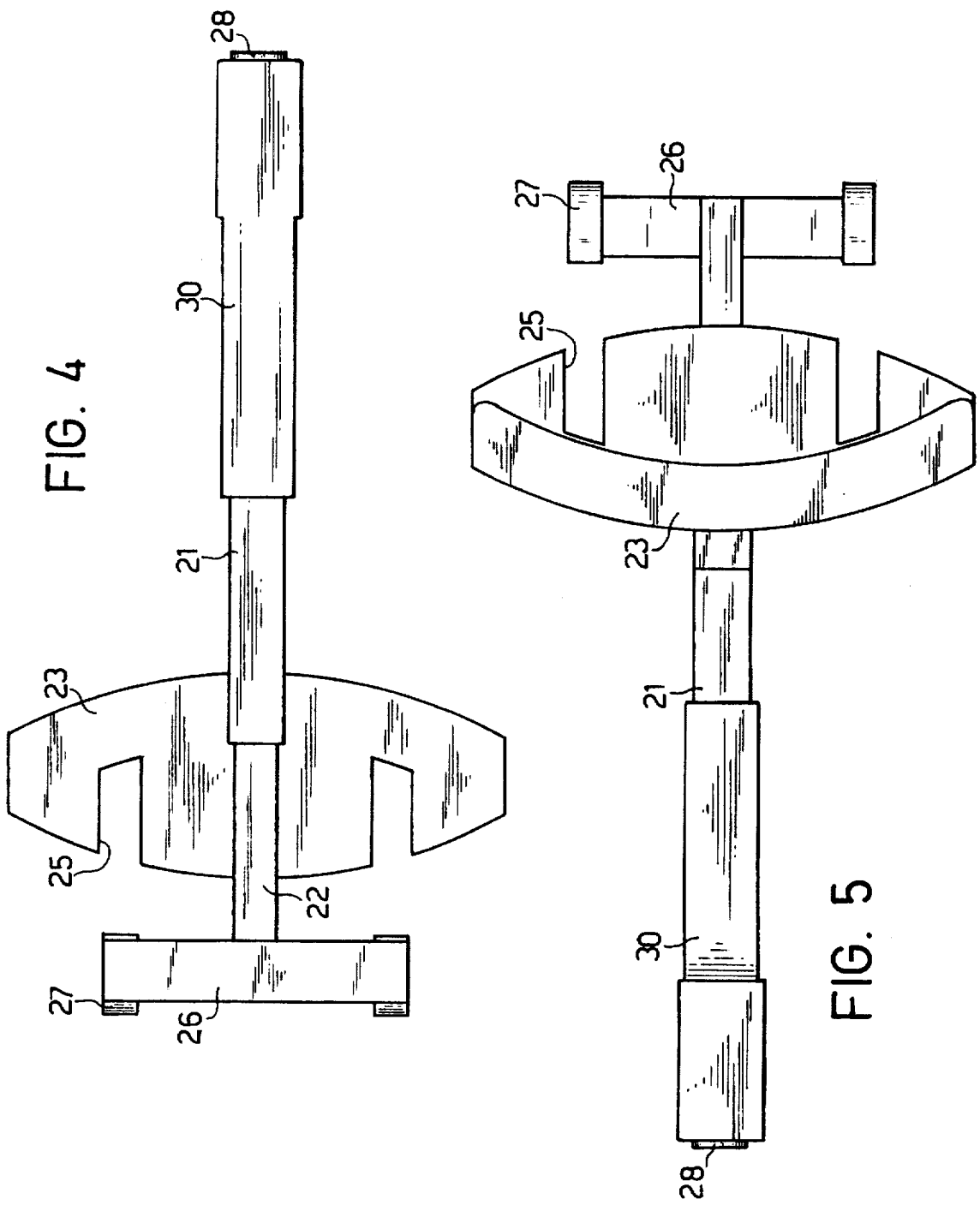

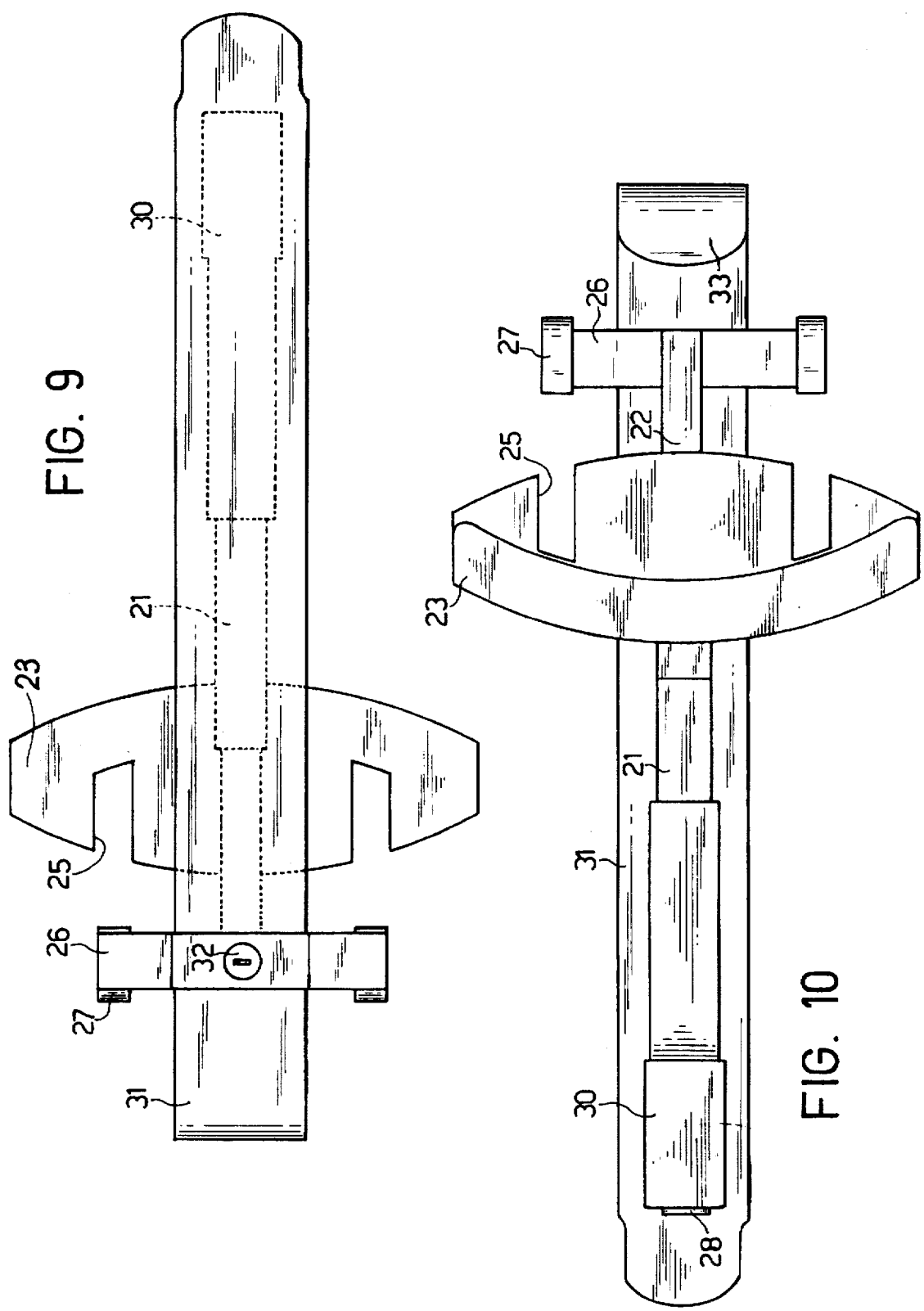

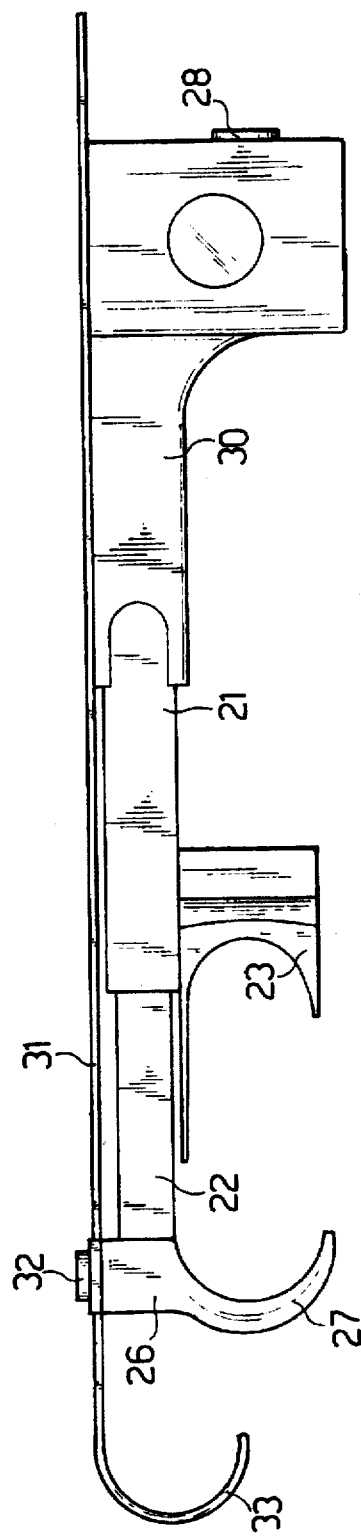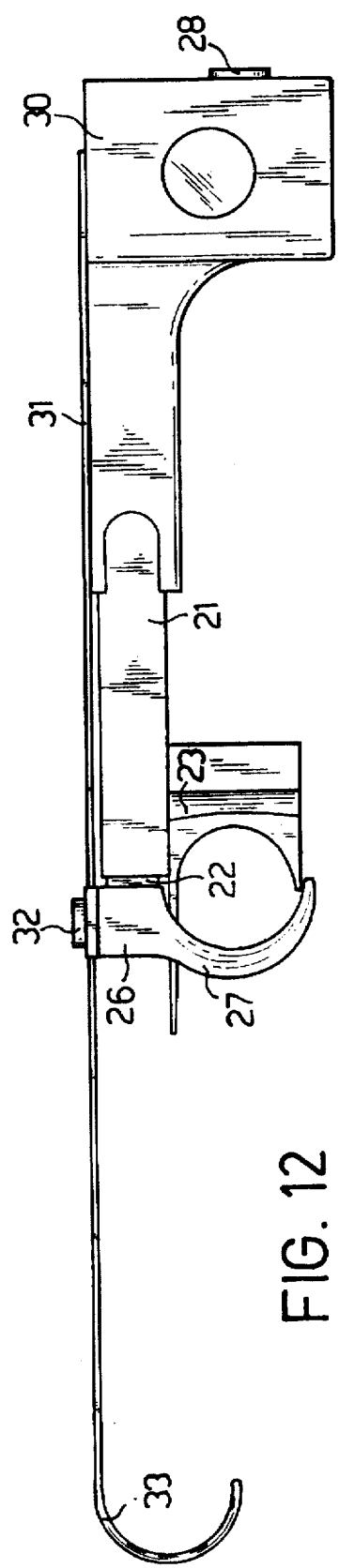
FIG. 11
FIG. 12

5,678,433

ANTITHEFT DEVICE FOR LOCKING THE STEERING WHEEL OF ANY KIND OF VEHICLE

FIELD OF THE INVENTION

The present invention relates to an antitheft device for locking the steering wheel of any kind of vehicle.

More particularly, the invention relates to an antitheft device of the above kind acting in the steering wheel so as to lock both the outer ring and the spokes, so as to make extremely difficult and laborious its removal by an ill-intentioned person.

BACKGROUND OF THE INVENTION

It is well known that at present many different antitheft mechanical devices are available. Their diffusion is obviously due to the always greater number of thefts and to the fact that the skill of the thieving is sufficient to avoid also the difficulties caused by the most sophisticated electronic devices.

Among the mechanical antitheft devices it is possible to individuate those acting on the vehicle pedals, eventually acting also on the steering wheel, and those provided only on the steering wheel, so as to prevent its free motion and thus the driving of the car.

The antitheft devices of the second kind presently available on the market are basically comprised of a mechanical element coupled to the steering wheel, preferably in an inner position, between two diametrically opposed points, and provided with an element projecting with respect to the steering wheel so as to strike, in case one tries to drive the car with the antitheft device on, against the front windscreen, against the door or against the legs of the driver, preventing the driving of the car.

This kind of structure can be easily removed by an ill-intentioned person provided with the suitable tools, simply making only one cut along the ring of the steering wheel close to the antitheft device, so as to make it possible to take off the same.

In view of the above, the antitheft effect of the above preexisting device is limited, and can at most be a deterrent for not well supplied or unskilled thieving, that therefore cannot properly work.

It must further be put into evidence that the Insurance Companies operating in countries like Great Britain does not reimburse the theft in the case where an antitheft device as described above is used, i.e. an antitheft device requiring only one cut for its removal.

SUMMARY OF THE INVENTION

In view of the above, the Applicant has realized a solution for an antitheft device to be applied to the vehicle steering wheel locking both the ring and the spokes of the steering wheel, so that its removal requires the execution of at least three different cuts.

Advantages deriving from a solution like that herein proposed are really remarkable, since the antitheft device according to the present invention realizes a safety element definitely better with respect to those presently available, satisfying also the needs of Insurance Companies.

It is therefore a specific object of the present invention to provide an antitheft device for locking the steering wheel of any kind of vehicle, comprising a first outer locking element, provided with means for coupling with a section of the steering wheel, a second inner locking element, movable with respect to said first locking element and provided with at least a projecting tongue coupling with the steering wheel and interacting with said coupling means with a section of the steering wheel provided on said first element so as to lock the outer ring of the steering wheel and at least one spoke of the steering wheel, and opening and closure means for the antitheft device. The first outer element being provided with a projection for interfering with other parts of the vehicle so as to prevent the free rotation of the steering wheel when the antitheft device is on.

According to a first embodiment of the antitheft device according to the invention, said first and second elements are made up of two tubular elements, slidingly provided one within the other, the outer element being provided with a shaped slot coupling with a section of the steering wheel and the inner element being provided with at least one curved projecting tongue, preferably two tongues, that, when the antitheft device is opened, is within the first element without obstructing said slot and when is closed is in correspondence of said slot, straddling on a spoke of the steering wheel.

Particularly, said opening and closure means of the antitheft device according to the invention can be comprised of at least one safety lock acting against one pin biased by a spring and designed for coupling within a hole provided within said second inner element.

Said lock can be provided at one end of the first outer element.

In a second preferred embodiment of the antitheft device according to the invention, said second element slides axially, in front and within said first outer element.

Particularly, said means for coupling with a section of the steering wheel is provided in said first element and is comprised of a circle arch element, coupable with a steering wheel having every diameter, and said at least one projecting tongue is provided at the bottom of a T-shaped element coupled to the second inner element and is curved.

Preferably, two curved tongues are provided.

Still according to the invention, above said second inner element a rod is provided, said rod being slidable with respect to the same element so as to conform to the diameter of the steering wheel, and its end opposite to the end coupled with the second inner element is curved so as to couple with the steering wheel ring, means being provided for locking said rod in position after the adjustment.

BRIEF DESCRIPTION OF THE PREFERRED EMBODIMENTS

The present invention will be now described for illustrative but not limitative purposes according to its preferred embodiments with particular reference to the figures of the enclosed drawings, wherein:

FIG. 1 is a partially sectioned view of a first embodiment of the antitheft device according to the invention;

FIG. 2 shows the antitheft device of FIG. 1 on a steering wheel;

FIG. 3 is a section view taken along line A—A of FIG. 2;

FIG. 4 is a top view of a second embodiment of the antitheft device according to the invention;

FIG. 5 is a bottom view of the antitheft device of FIG. 4;

FIG. 9 is a top view of a third embodiment of the antitheft device according to the invention;

FIG. 10 is a bottom view of the antitheft device of FIG. 9;

FIG. 11 is a lateral view of the antitheft device of FIG. 9 open;

FIG. 12 is a lateral view of the antitheft device of FIG. 9 closed; and

DETAILED DESCRIPTION OF THE PREFERRED EMBODIMENTS

Figure 6:
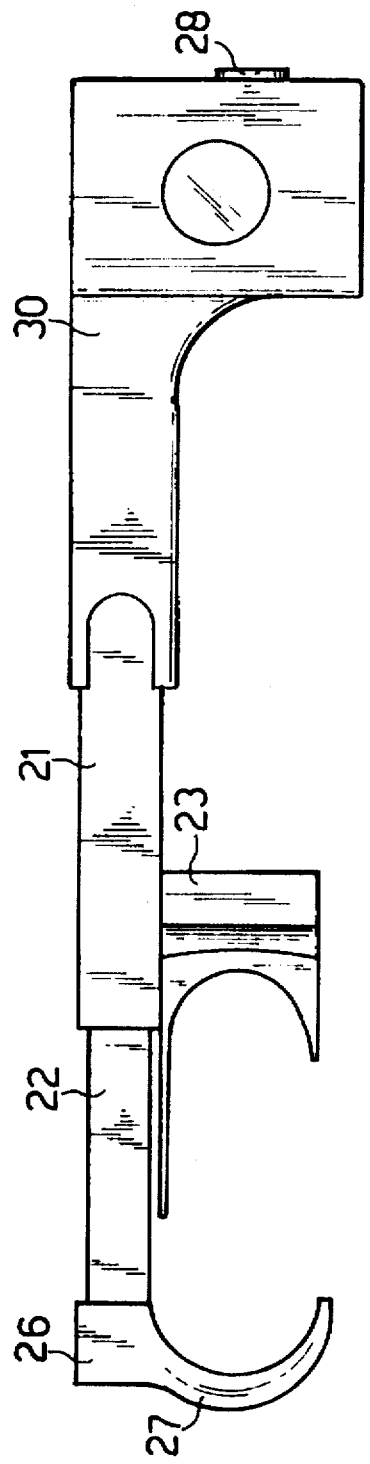
FIG. 6 is a lateral view of the antitheft device of FIG. 4 open.

Making first reference to FIGS. 1–3, the antitheft device according to the invention comprises a substantially tubular outer element 1, having a slot 2, so shaped to be provided on the ring 3 of the vehicle steering wheel, enclosing also the spokes 4. In FIG. 2 it is shown in dotted lines also a second ring 3', in order to demonstrate that the antitheft device can be applied on any kind of steering wheel, aside from its dimensions.

The shape of the slot 2 is such that it couples with a steering wheel having any diameter, either of the sport kind or those for lorries, taking also the spokes 4, aside their number and dimensions.

Within the outer element 1, an inner element 5 is provided, said element 5 being provided with two projecting tongues 6 which, when the antitheft device is in the position shown in FIG. 2, are in a straddling position on the steering wheel spoke 4.

Theoretically, it can be also provided only one projecting element 6, or a number greater than the one shown.

Further, the antitheft device according to the invention is provided with a lock 7, with key 8, acting on a pin 9, biased by the action of a spring 10, said pin 9 coupling and uncoupling with a hole 11 realized on the inner element 5.

As already said in the above, the number, the position and the kind of lock can be modified according to the specific needing without thus modifying the basic solution according to the invention.

When it is wished to put the antitheft device according to the invention on the car steering wheel, the inner element 5 is brought in such a position with respect to the outer element 1 that the projecting tongues 6 are positioned within the element 1, without occupying the space for the slot 2.

Then, the antitheft device according to the invention is brought on the steering wheel, with the slot 2 resting on the ring.

Now, simply rotating by the lock 7, previously opened, the inner element 5 with respect to the outer element 1, the tongues 6 are brought in correspondence of the slot 2, until the pin 9 is snapped within the check hole 11, locking the antitheft device in this position.

It can be easily seen from FIGS. 1–3 that the antitheft device proposed and described locks both the steering wheel ring 3 in two positions, and the spoke 4, so that in order to release the antitheft device it is necessary to make three different cuts, and the part of the outer 1 and inner 5 elements projecting with respect to the steering wheel realize an obstacle to the free rotation of the steering wheel.

Obviously, the elements 1 and 5, as well as the lock 7, will be realized employing materials and technical solutions making them extremely safe with respect to possible effractions.

Further, the antitheft device will be realized and finished so as not to damage parts of the vehicle and not to injure the user.

Referring now to FIGS. 4–8, it is shown a second embodiment of the antitheft device according to the invention, wherein it is provided a first element 21, working as handle and preventing the rotation of the steering wheel, and a second element 22, longitudinally sliding with respect to the first element 21, having the locking devices that will be described in greater detail in the following.

At the bottom of the first element 21 there is provided a shaped element 23, which couples externally with the ring 24 of the steering wheel (see FIG. 8) and provided with two slots 25.

Figure 7:
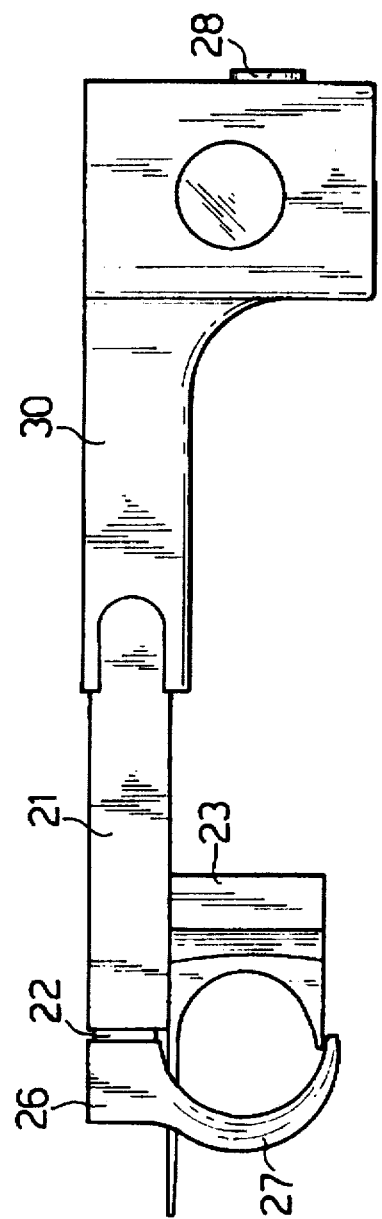
FIG. 7 is a lateral view of the antitheft device of FIG. 4 closed.

At the end of the element 22 opposed to the one sliding coupled with the first element 21, a T-shaped element 26 is provided, said element 26 having two tongues 27, downward projecting, and shaped so as to couple with the ring 24 of the steering wheel (see FIG. 8), and spaced apart each other so as to couple with the slots 25, when the antitheft device is closed (see FIG. 7).

It is further provided an opening and closure lock 28 for the antitheft device, in this case shown above the first element 21, but that can be of different kind, differently positioned and in different number.

The antitheft device according to FIGS. 4–8 is provided opened, as shown in FIG. 6, on the steering wheel ring, and thus, by the sliding of the element 22 backward within the element 21, the closure is obtained as shown in FIG. 7.

Figure 8:
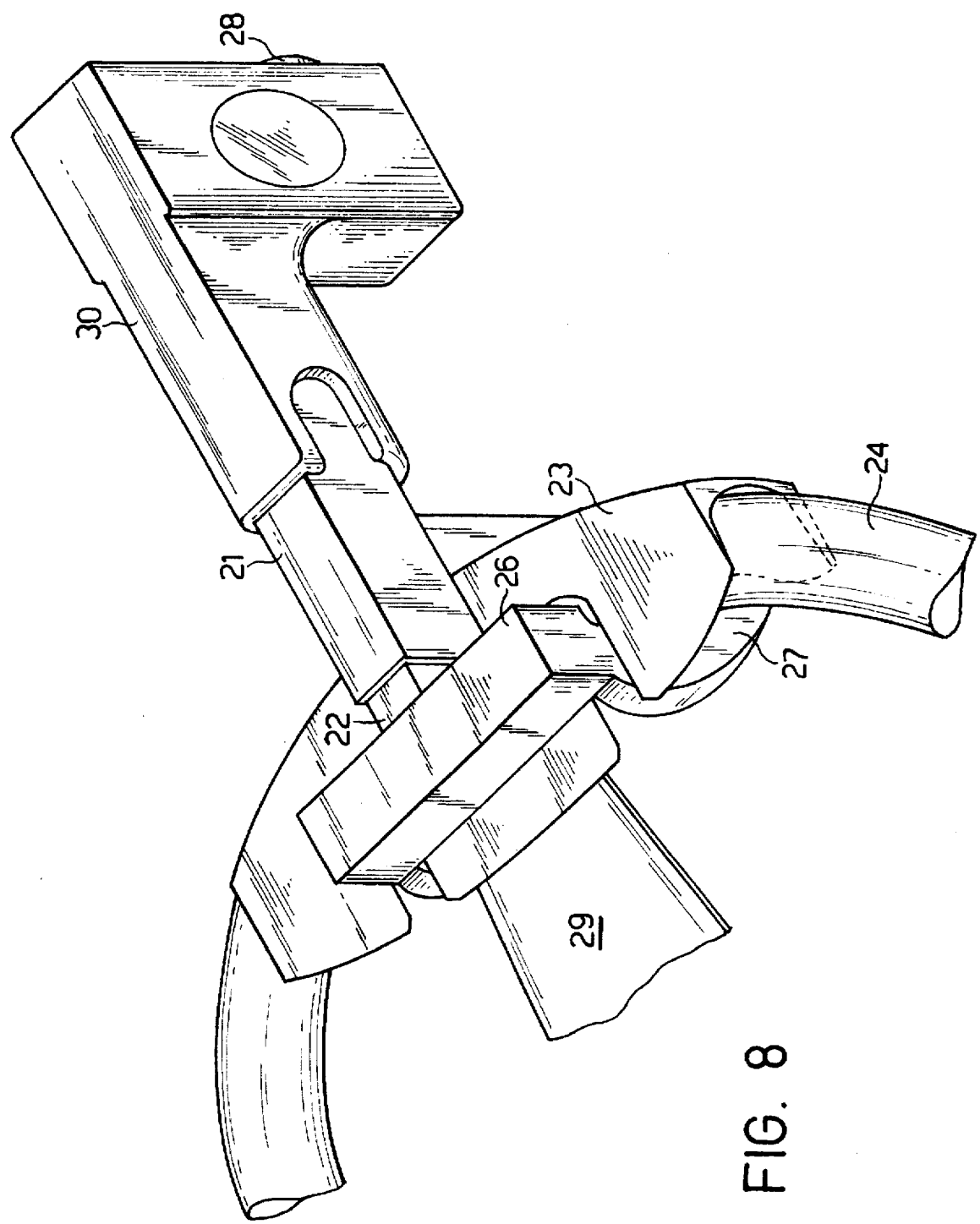
FIG. 8 is a perspective view of the antitheft device of FIG. 4 on a steering wheel.

Once closed, the antitheft device is placed on the steering wheel as shown in FIG. 8, so that the locking of the ring 24 in two positions and of the spoke 29 is obtained. Consequently, in order to release the antitheft device without employing the lock 28 it would be necessary to make three cuts.

The rear handle portion 30 will constitute the obstacle to the rotation of the vehicle steering wheel, and furthermore locks the sliding part 22 on the tubular 21 by the main lock 28 placed within the handle 30.

In FIGS. 9–13, a third embodiment of the antitheft device according to the invention very similar to the one described with reference to the FIGS. 4–8 is shown, so that the corresponding elements are indicated by the same reference and will not be further described.

Particularly, the only substantial difference with respect to the former embodiment is the provision of a rod 31, slidingly supported above the T-shaped element 26, and having the end 33 opposite to the one coupled with the T-shaped element 28 curved, so as to be coupable with the steering wheel ring 24.

Therefore, when it is wished to put the antitheft device on, it is sufficient at first to bring the end 33 of the rod 31 on the portion of the ring 24 opposite with respect to the one upon which the antitheft device is placed, and thus withdrawing the element 21—element 22 assembly back, until extending the rod 31 out of the T-shaped element 26 for the length corresponding to the steering wheel diameter.

Now, the rod 31 is locked by the lock 33 and the antitheft device is placed as previously described.

Figure 13:
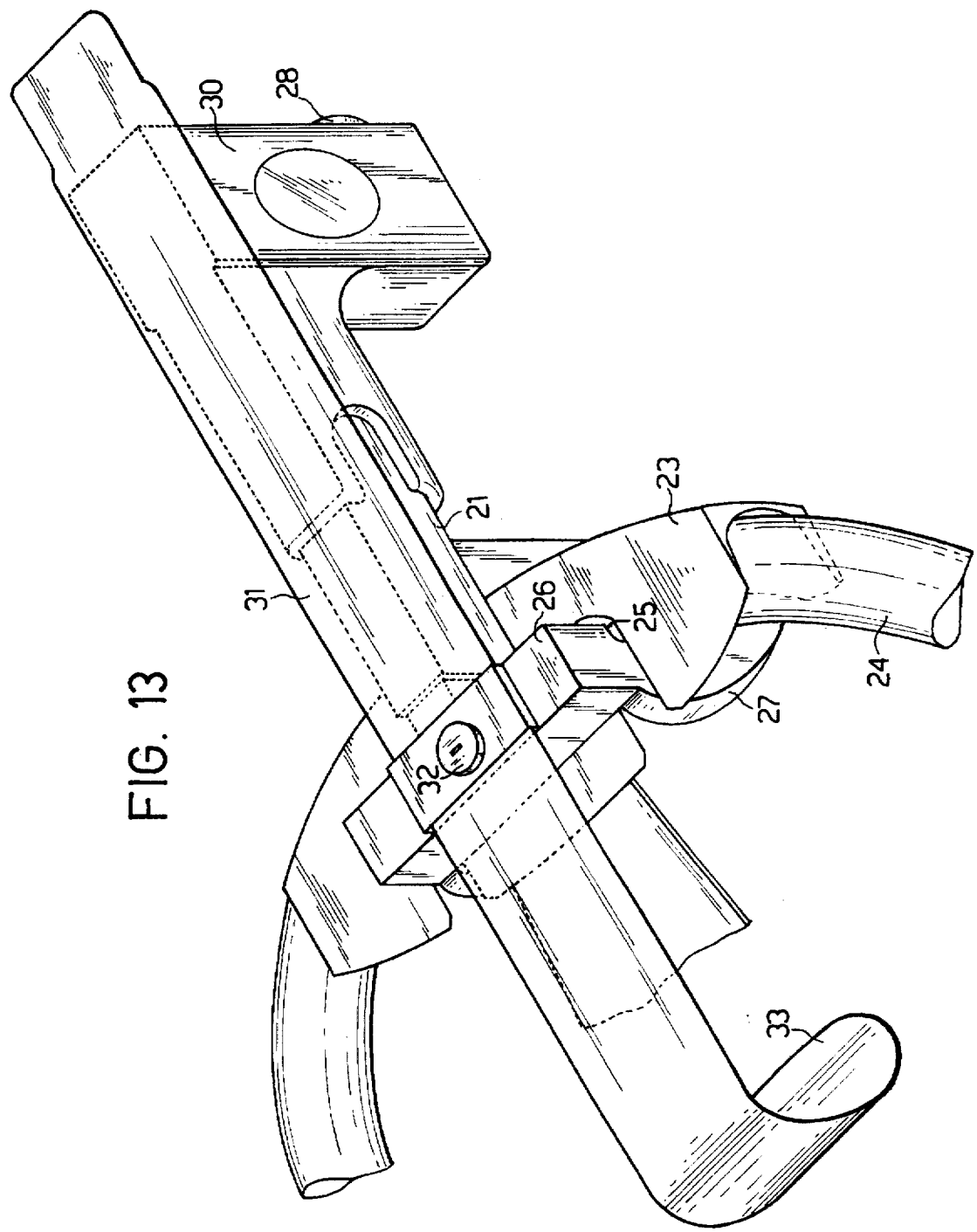
FIG. 13 is a perspective view of the antitheft device of FIG. 9 on a steering wheel.

This solution is described in FIG. 13.

The present invention has been described for illustrative, but not limitative purposes, according to its preferred embodiments, but it is to be understood that modifications and/or changes can be introduced by those skilled in the art without departing from the relevant scope as defined in the enclosed claims.

I claim:

1. An antitheft device for locking a steering wheel of a vehicle, comprising:

a first locking element having means for coupling with a section of the steering wheel, said first locking element including a support member having a pair of laterally spaced slots formed therein extending into said support member from a peripheral edge of said support member;

a second locking element which extends above and below said support member and has a pair of laterally spaced projection tongues which are slideable into said laterally spaced slots such that a spoke of a steering wheel is straddled by said projection tongues, and one of said first and second locking elements supporting the other in a manner allowing one of said locking elements to slide with respect to the other such that, upon said projection tongues sliding within said laterally spaced slots, a peripheral section of said steering wheel is locked within a chamber defined by said first and second locking elements which are in an intermeshed state, a lock assembly for locking said first and second locking elements in the intermeshed state;

said first locking element including an interfering projection which extends outward from the steering wheel for interfering contact with a vehicle part upon rotation of the steering wheel while said antitheft device is in a locked state, and said second locking element slides axially, in front and within said first locking element, and said first locking element includes means for coupling with a section of the steering wheel placed in contact with said first locking element which coupling means is comprised of a circle arch element, coupable with a steering wheel having every diameter and said second locking element having a T-shape configuration with said projecting tongues being provided at the bottom of said T-shaped element slidingly coupled to said first locking element and are curved.

2. An antitheft device for locking a steering wheel of a vehicle, comprising:

a first locking element having means for coupling with a section of the steering wheel, said first locking element including a support member having a pair of laterally spaced slots formed therein extending into said support member from a peripheral edge of said support member;

a second locking element which extends above and below said support member and has a pair of laterally spaced projection tongues which are slideable into said laterally spaced slots such that a spoke of a steering wheel is straddled by said projection tongues, and one of said first and second locking elements supporting the other in a manner allowing one of said locking elements to slide with respect to the other such that, upon said projection tongues sliding within said laterally spaced slots, a peripheral section of said steering wheel is locked within a chamber defined by said first and second locking elements which are in an intermeshed state, a lock assembly for locking said first and second looking elements in the intermeshed state;

said first locking element including an interfering projection which extends outward from the steering wheel for interfering contact with a vehicle part upon rotation of the steering wheel while said antitheft device is in a locked state, and said second locking element includes a rod which is slidable with respect to said first locking element so as to conform to the diameter of the steering wheel, and an end of said rod opposite to an end coupled with the second locking element is curved so as to couple with the steering wheel ring, and said lock assembly including means for locking said rod in position after the adjustment.

3. An antitheft device for locking a steering wheel, comprising:

an outer tubular element having a shaped slot for coupling with a peripheral section of the steering wheel, said outer tubular element being provided with a vehicle interference projection which interferes with a vehicle part so as to prevent free rotation of the steering wheel when the antitheft device is in a locking mode;

an inner tubular element rotatably received within said outer tubular element, said inner tubular element having a pair of curved projecting tongues which are longitudinally spaced for straddling a spoke of the steering wheel, said inner tubular element being dimensioned such that, upon rotation to a first position, the antitheft device is in an open mode wherein the peripheral steering wheel section is receivable through said shaped slot and into said outer tubular element and, upon rotation to a second position, said antitheft device is in the locking mode wherein said projecting tongues block off the peripheral steering wheel section from being withdrawn through the shaped slot and out of said outer tubular element; and a locking assembly for locking said antitheft device in said locking mode, and wherein said outer tubular element is a monolithic unit which monolithic unit includes said interfering projection as an integral part thereof, and said locking assembly includes a key reception assembly at an outer end of said interference projection which is rotated about a common axis with that of said rotatable inner tube.

4. An antitheft device as recited in claim 3, wherein said shaped slot is of a longitudinal length which forms a first slot portion between a first end of said shaped slot and an outer side of a first of said projecting tongues and a second slot portion between a second end of said shaped slot and an outer side of a second of said projecting tongues, and said slot portions being of a longitudinal length sufficient to handle a range of different sized steering wheels having different peripheral curve radiuses in the peripheral section of the steering wheel being coupled by said outer tubular element.

5. An antitheft device as recited in claim 3, wherein said interference projection forms a part of said outer tubular element, and said inner tube extends away from said steering wheel to an outer end of said interference projection.

6. Antitheft device according to claim 3, characterized in that said locking assembly is comprised of at least one safety lock acting against one pin biased by a spring and coupling within a hole provided within said inner tubular element.

7. An antitheft device for locking a steering wheel, comprising:

an outer tubular element having a shaped slot for coupling with a peripheral section of the steering wheel, said outer tubular element being provided with a vehicle interference projection which interferes with a vehicle part so as to prevent free rotation of the steering wheel when the antitheft device is in a locking mode;

an inner tubular element rotatably received within said outer tubular element, said inner tubular element having a pair of curved projecting tongues which are longitudinally spaced for straddling a spoke of the steering wheel, said inner tubular element being dimensioned such that, upon rotation to a first position, the antitheft device is in an open mode wherein the peripheral steering wheel section is receivable through said shaped slot and into outer tubular element and, upon rotation to a second position, said antitheft device is in the locking mode wherein said projecting tongues block off the peripheral steering wheel section from being withdrawn through the shaped slot and out of said outer tubular element; and a locking assembly for locking said antitheft device in said locking mode, said locking assembly including a key insert slot which extends in a common direction with a central axis of said inner tubular element such that rotation of the key results in rotation of the inner tubular element.

8. An antitheft device for locking a steering wheel of a vehicle, comprising:

a first locking element having means for coupling with a section of the steering wheel, said first locking element including a support member having a pair of laterally spaced slots formed therein extending into said support member from a peripheral edge of said support member;

a second locking element which extends above and below said support member and has a pair of laterally spaced projection tongues which are slideable into said laterally spaced slots such that a spoke of a steering wheel is straddled by said projection tongues, and one of said first and second locking elements supporting the other in a manner allowing one of said locking elements to slide with respect to the other such that, upon said projection tongues sliding within said laterally spaced slots, a peripheral section of said steering wheel is locked within a chamber defined by said first and second locking elements which are in an intermeshed state, a lock assembly for locking said first and second locking elements in the intermeshed state; and said first locking element including an interfering projection which extends outward from the steering wheel for interfering contact with a vehicle part upon rotation of the steering wheel while said antitheft device is in a locked state, and wherein said first locking element includes a reception cavity for telescopically receiving an elongated section of said second locking element and said second locking element includes a grasping block slidingly positioned above said support member, and said projecting tongues extending downwardly off from said grasping block and through said laterally spaced slots.

9. An antitheft device as recited in claim 8, wherein said support member includes a plate that extends radially inward toward a center of the steering wheel to a greater extent than the most radially inward portion of said tongue projections when said tongue projections are in contact with a closed end of said slots which are formed in said plate, whereby said tongues can assume a plurality of radial positions within said slots to conform to different size steering wheel rings.

10. Antitheft device according to claim 8, characterized in that said second locking element slides axially, in front and within said first locking element.

11. An antitheft device for locking the steering wheel of vehicles, comprising:

a first outer locking element provided with means for coupling with a section of the steering wheel;

a second inner locking element that is movable with respect to said first locking element and is provided with two projecting tongues for coupling with the steering wheel and interacting with said coupling means at the section of the steering wheel coupled by said first element so as to lock the outer ring of the steering wheel and straddle at least one spoke of the steering wheel;

opening and closure means for placing said antitheft device in an unlocked mode and a locked mode, and said first outer element being provided with a projection member dimensioned to interfere with a part of the vehicle so as to prevent free rotation of the steering wheel when the antitheft device is in the locked mode, and wherein said second element slides axially, in front and within said first outer element, and above said second inner element a rod is provided, said rod being slidable with respect to the second inner element so as to conform to the diameter of the steering wheel, and an end of said rod opposite to the end coupled with the second inner element is curved so as to couple with the steering wheel ring, and means being provided for locking said rod in position after the adjustment.

12. Antitheft device according to claim 3, characterized in that said locking assembly is provided at one end of the first outer element and has a key slot which extends inward in a common direction with a direction of elongation of said first outer element.

* * * * *